Figure 1:
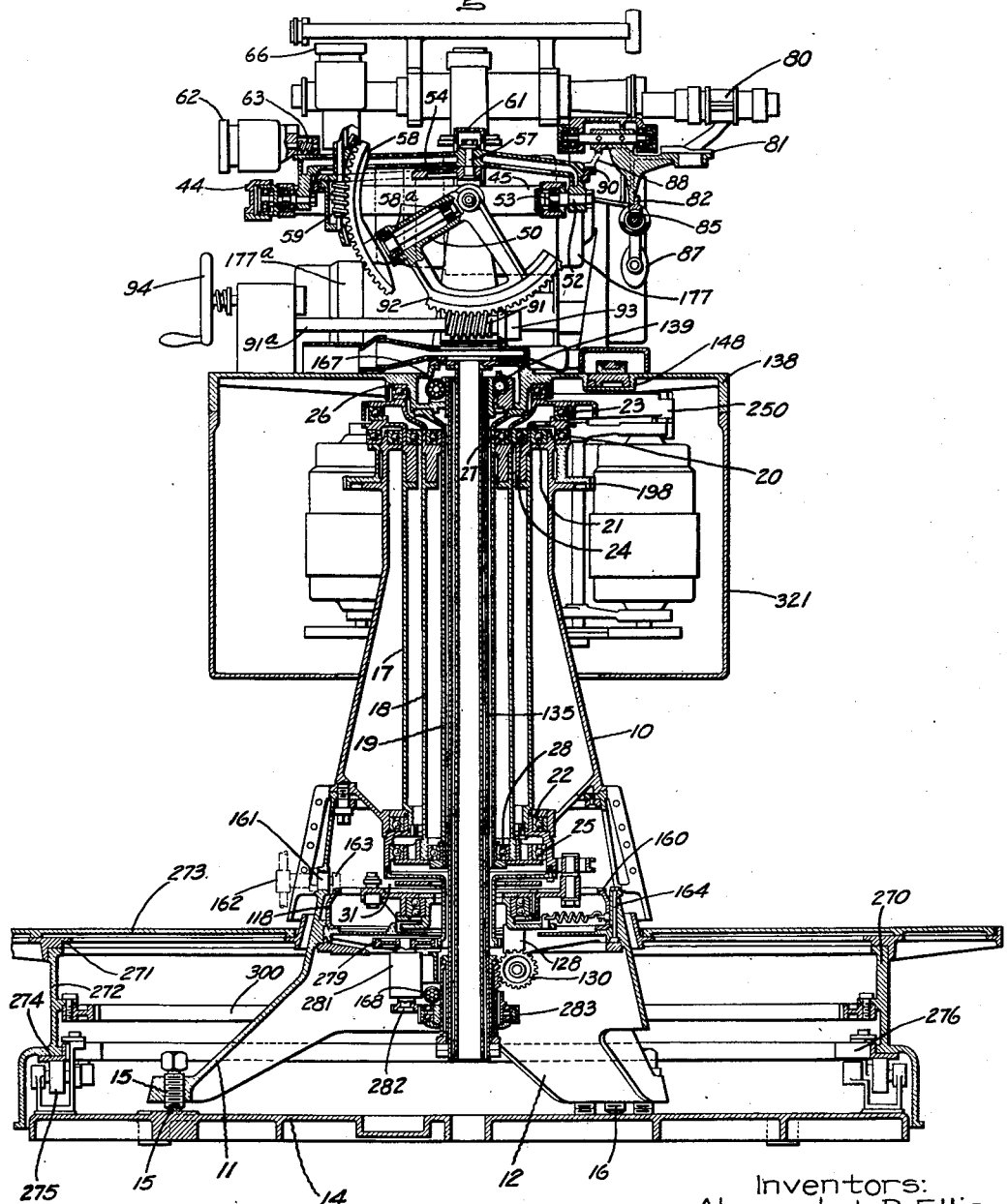

Oct. 16, 1928.

A. L. R. ELLIS ET AL 1,687,551

CONTROL OF ORDNANCE

Filed June 4, 1925

9 Sheets-Sheet 1

Inventors:
Alvarado L. R. Ellis,
Chester W. Greene,
by
Their Attorney.

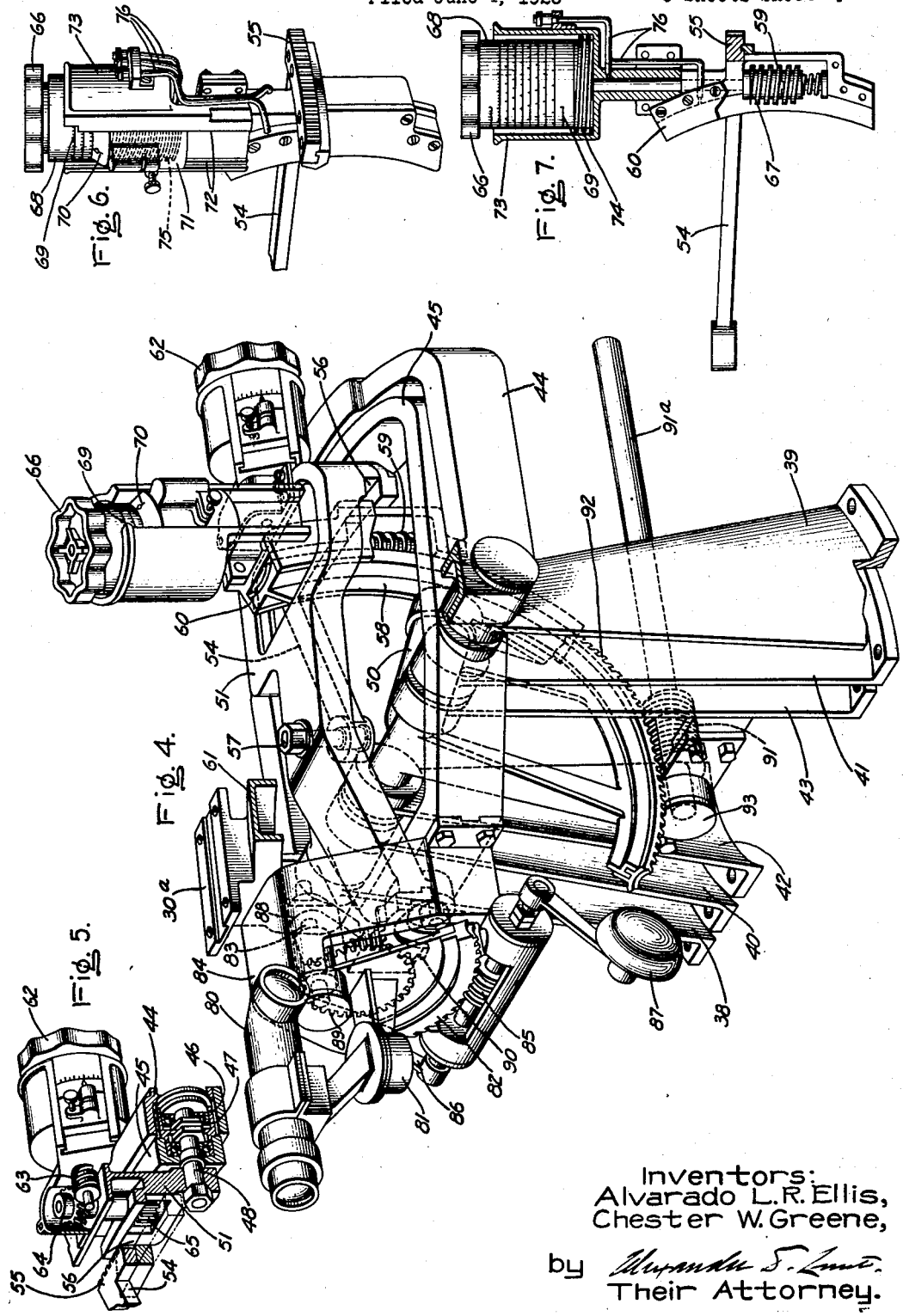

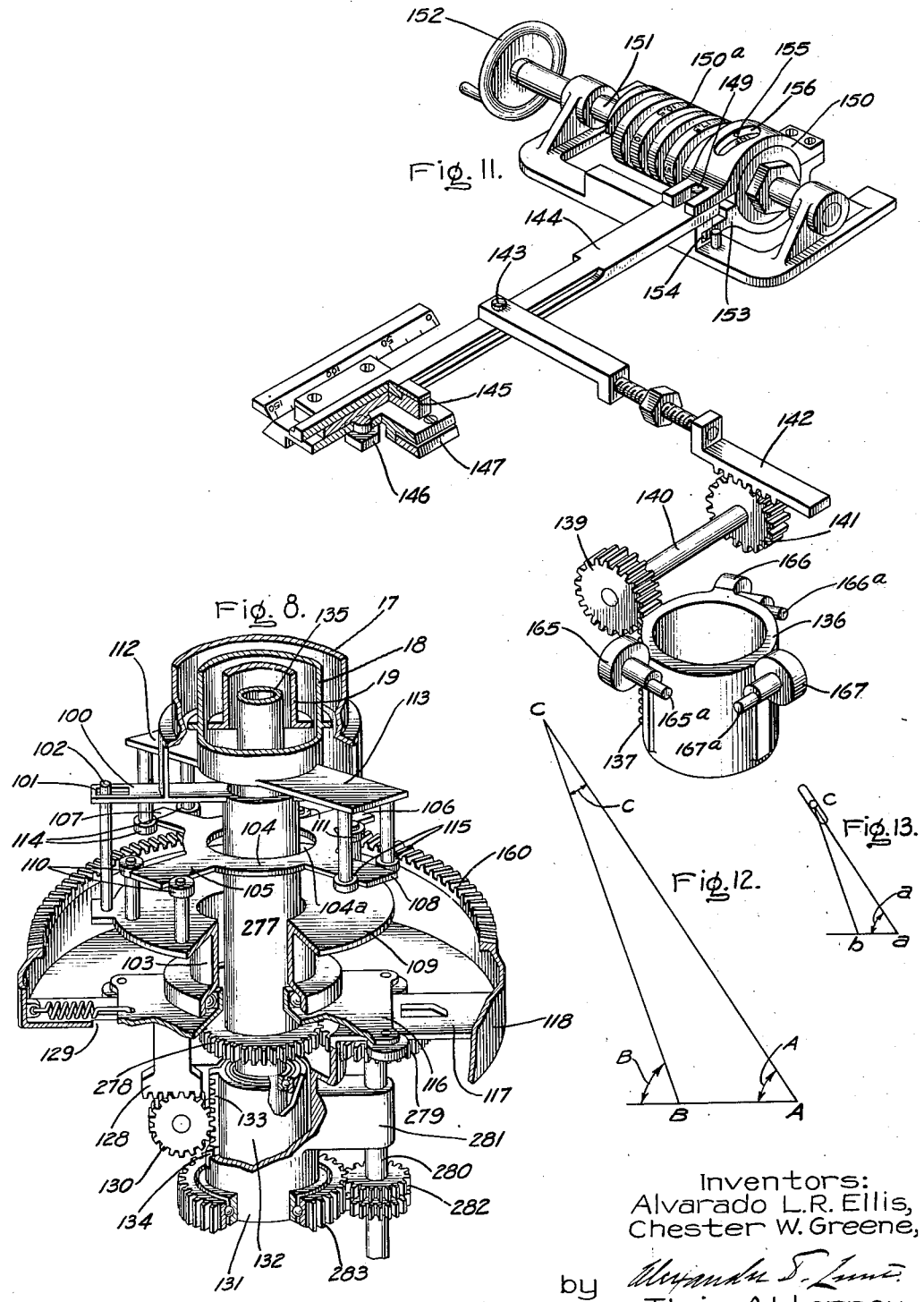

Oct. 16, 1928.
A. L. R. ELLIS ET AL
1,687,551
CONTROL OF ORDNANCE
Filed June 4, 1925
9 Sheets-Sheet 6
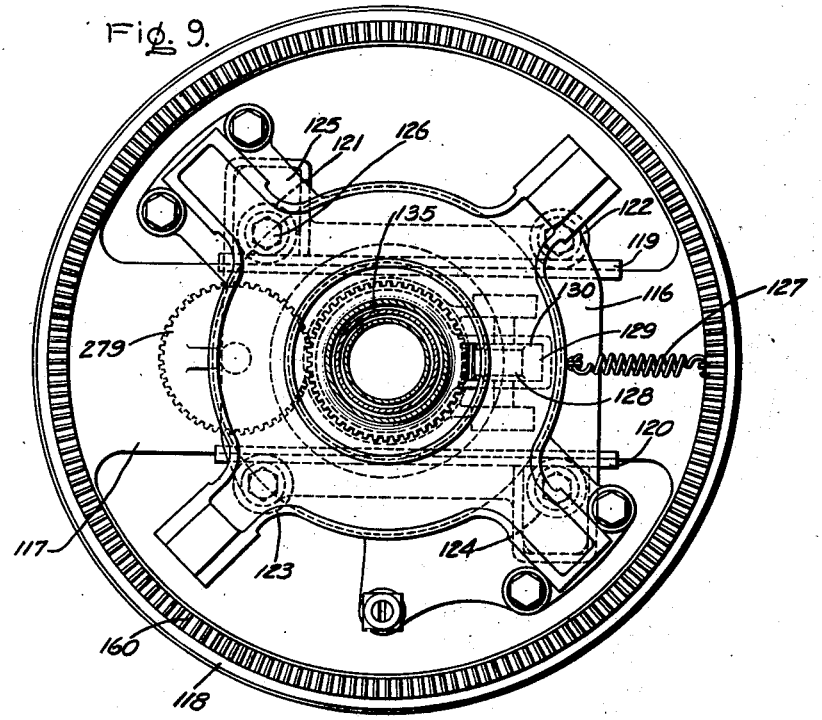
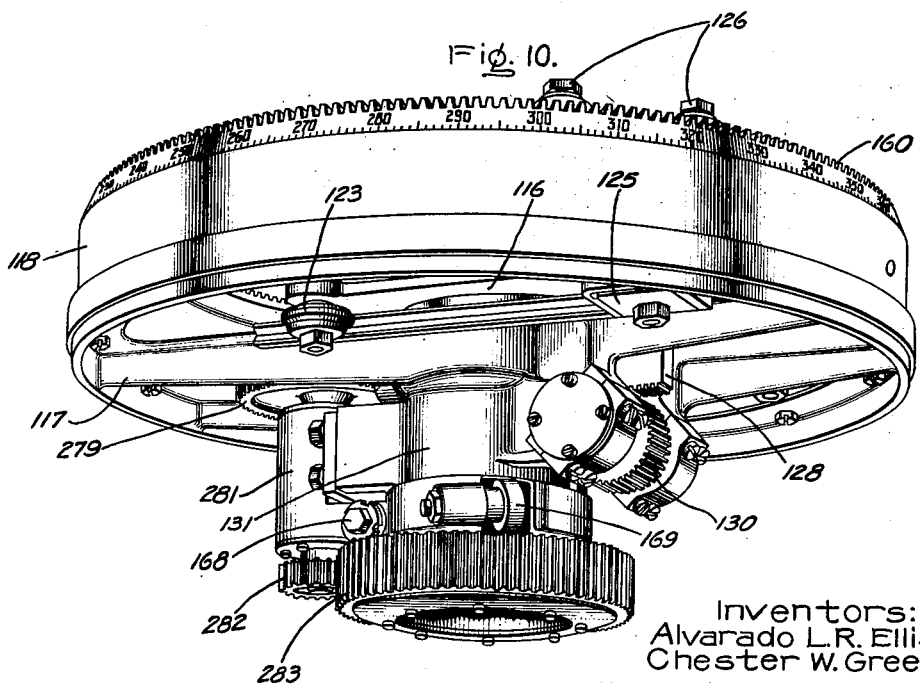
Inventors:
Alvarado L. R. Ellis,
Chester W. Greene,
by
Their Attorney.

Oct. 16, 1928.
1,687,551
A. L. R. ELLIS ET AL
CONTROL OF ORDNANCE
Filed June 4, 1925  9 Sheets-Sheet 7
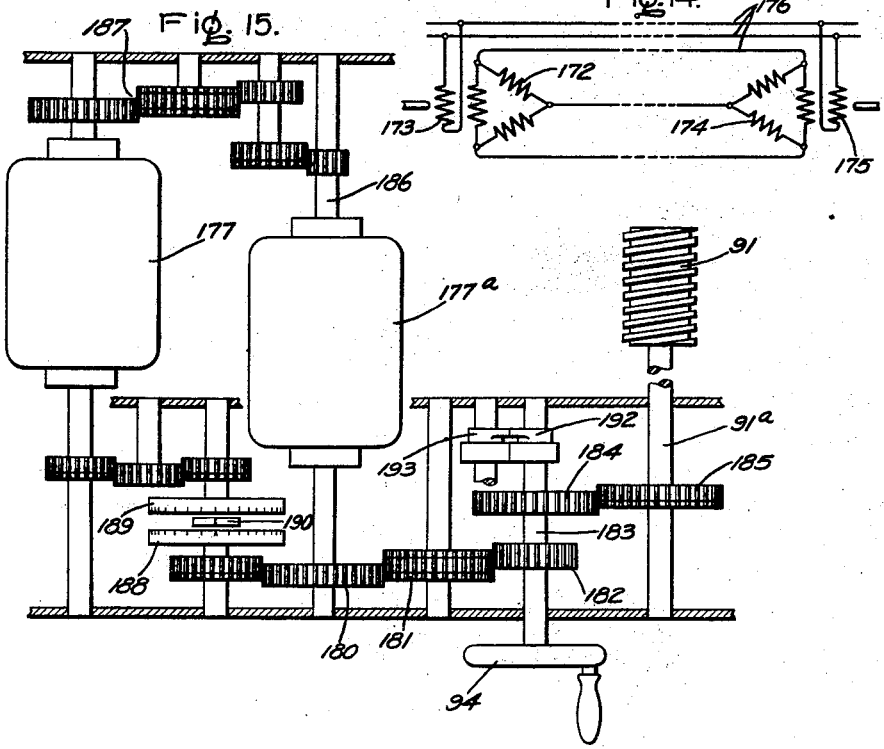
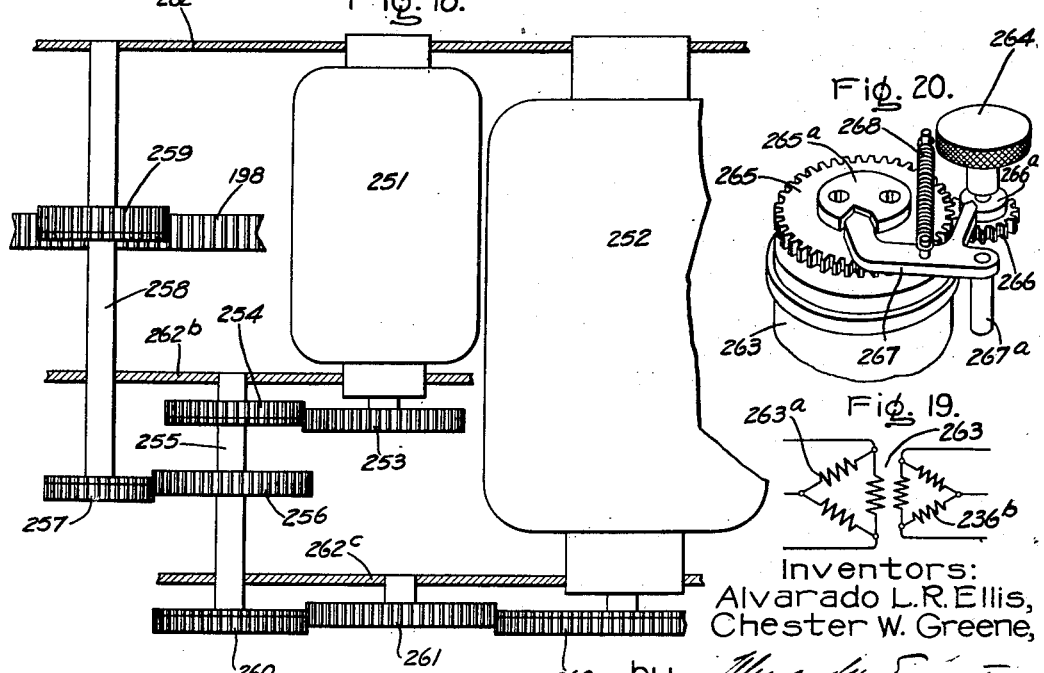
Inventors:
Alvarado L. R. Ellis,
Chester W. Greene,
by
Their Attorney.

Inventors:
Alvarado L. R. Ellis,
Chester W. Greene,
by
Their Attorney.

Oct. 16, 1928.
A. L. R. ELLIS ET AL
1,687,551
CONTROL OF ORDNANCE
Filed June 4, 1925
9 Sheets-Sheet 9
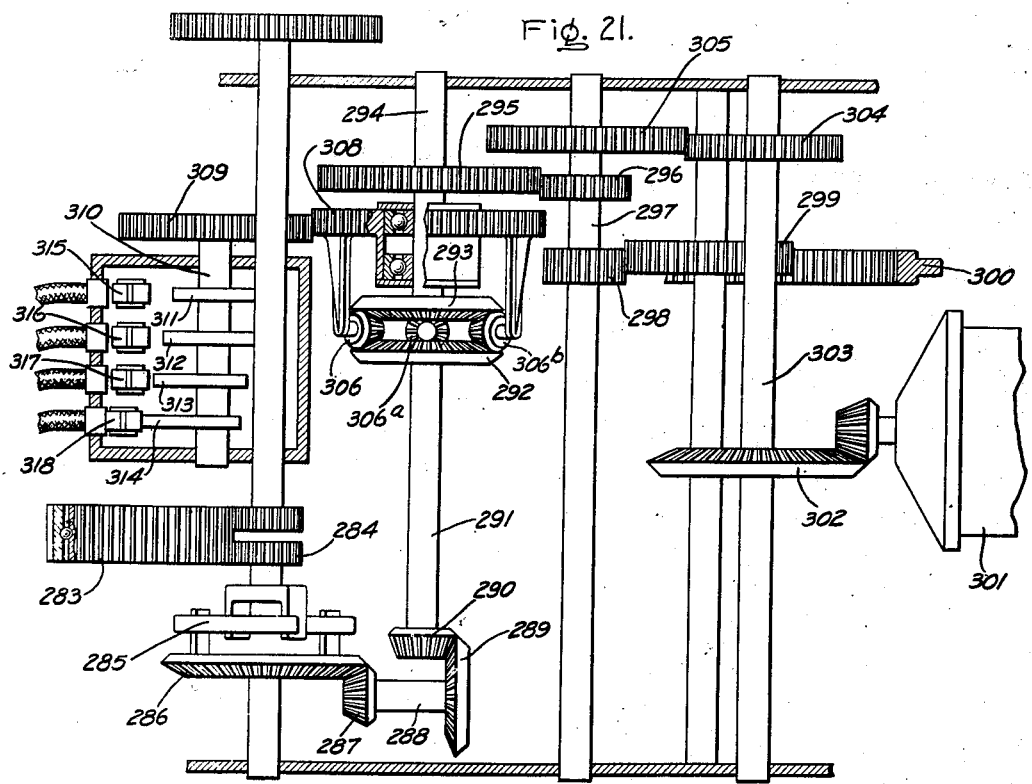
Inventors:
Alvarado L.R. Ellis,
Chester W. Greene,
by
Their Attorney.

Patented Oct. 16, 1928.

1,687,551

UNITED STATES PATENT OFFICE.

ALVARADO L. R. ELLIS, OF SWAMPSCOTT, AND CHESTER W. GREENE, OF LYNN, MASSACHUSETTS, ASSIGNORS TO GENERAL ELECTRIC COMPANY, A CORPORATION OF NEW YORK.

CONTROL OF ORDNANCE.

Application filed June 4, 1925. Serial No. 34,950.

This invention relates to apparatus for controlling ordnance and the like, more particularly to apparatus for controlling guns on shipboard, and has for its object the provision of a controlling instrument or director in which various corrections may be introduced.

While our invention has special application in the control of ordnance, it obviously has application also to the control of various other devices such as searchlights, torpedo tubes, etc.

More specifically our invention relates to systems for the remote control of guns on shipboard of the type in which the guns are directed in accordance with information of the position of the target received from a remote sighting instrument or director. It is necessary, however, in directing the gun to apply various corrections to the actual movements of the sighting device, such, for example, as corrections for parallax between the sighting device and the gun, range, deflection, etc. The parallax corrections may be introduced in the planes of movement of the gun or in parallel planes. The range and deflection corrections, however, are calculated with reference to vertical and horizontal planes respectively, the range correction being a function of the range, and the deflection correction being a function of the velocity and direction of the wind, drift speed and direction of the ship and target, etc. and these calculated values can be accurately introduced only when the elevation and train axes of the gun are respectively horizontal and vertical. It becomes necessary, therefore, to adapt the range and deflection corrections for inclination of the axes of the gun, if any, at the moment the corrections are introduced, and thereafter vary the elevation and train of the gun in conformity with the changed values of these introduced corrections due to changes in the inclination of the axes of the gun.

In carrying out our invention, we provide mechanism associated with the sighting device by means of which the various corrections may be introduced and whereby the range and deflection corrections are introduced in such manner as to correspond with the inclination of the train and elevation planes at the particular moment, and are thereafter varied to correspond with changes in the inclination of these axes. The information received from the director therefore is always a correct indication of the desired position of the gun.

Figure 2:
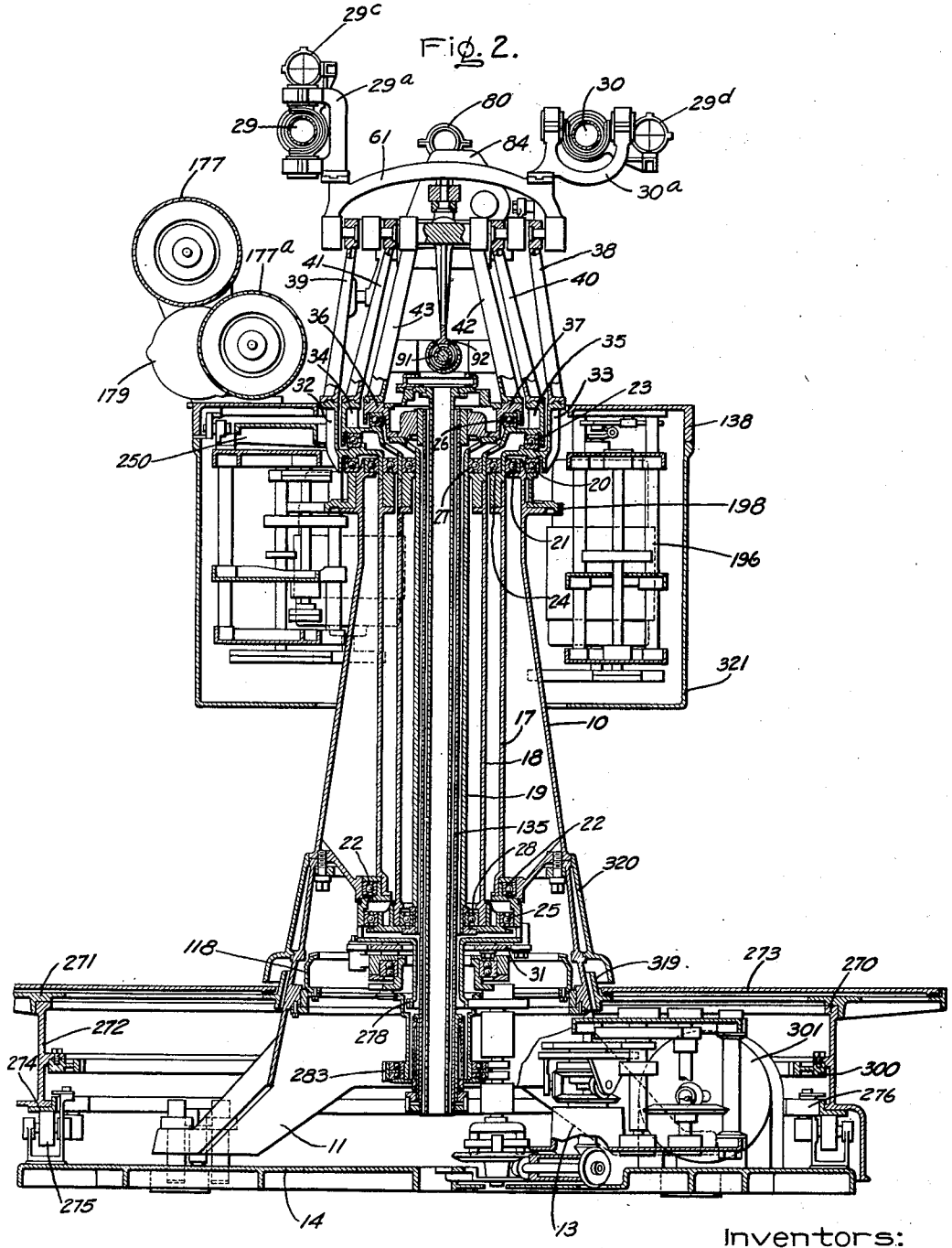
Figure 3:
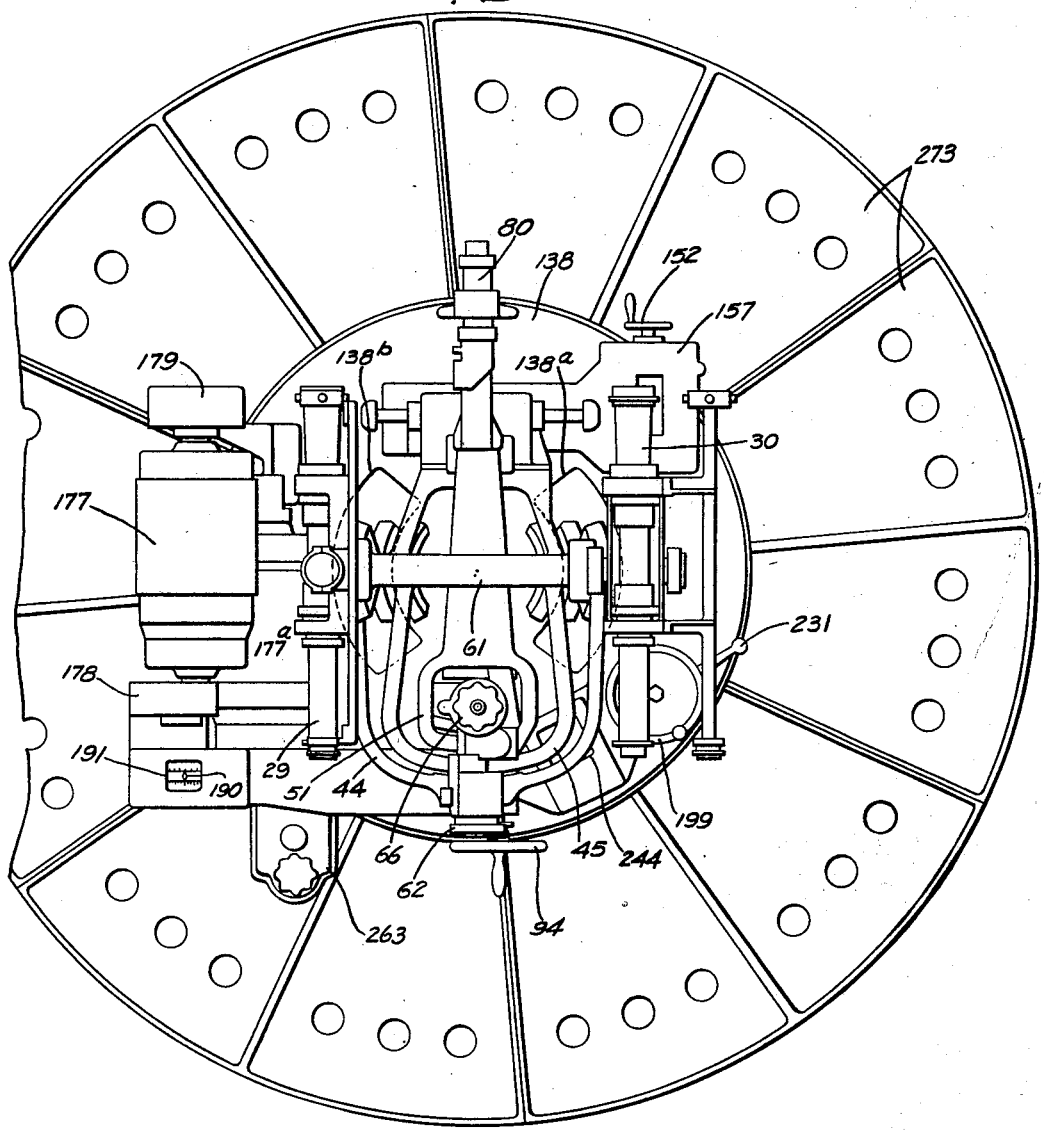
Figure 16:
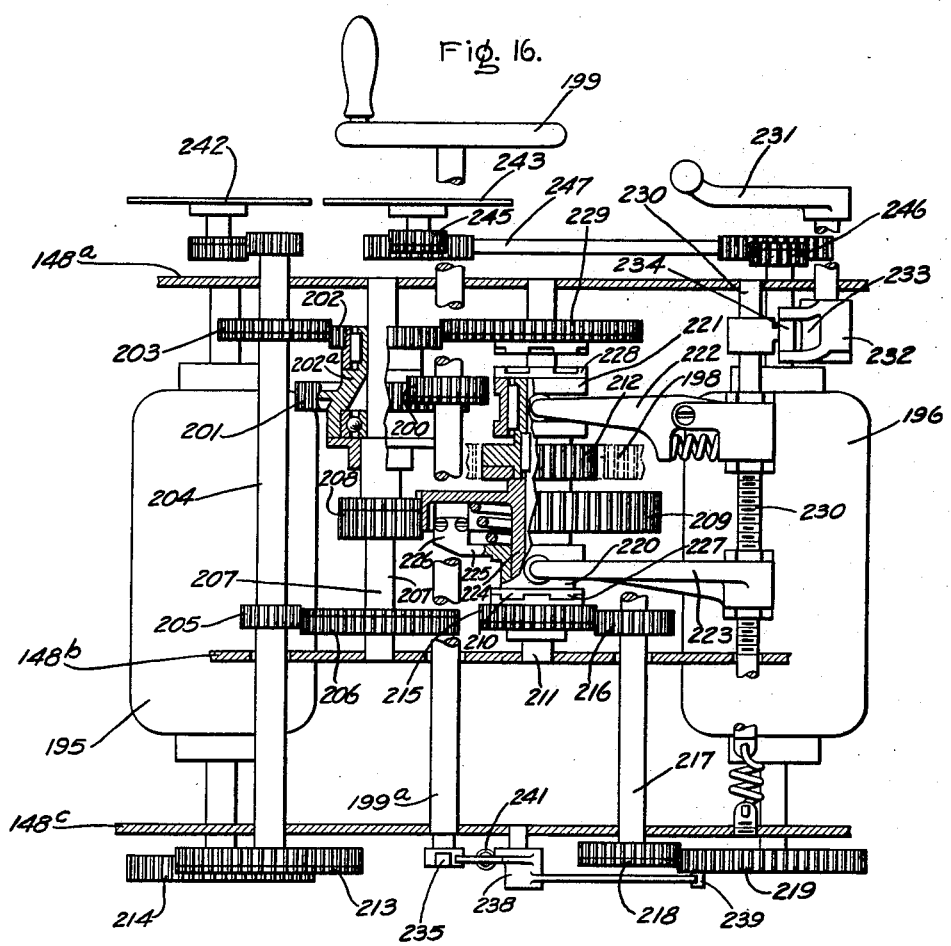
Figure 17:
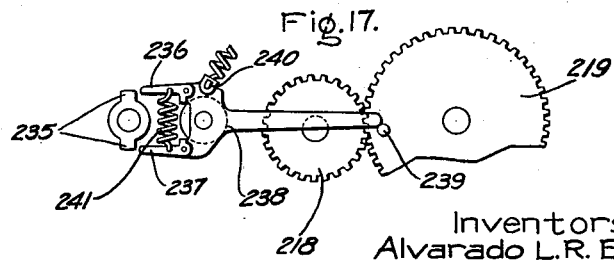

For more complete understanding of our invention, reference should be had to the accompanying drawings in which Fig. 1 is a side elevation view in section of apparatus for controlling ordnance embodying our invention; Fig. 2 is the end elevation view in section of the device shown in Fig. 1; Fig. 3 is a plan view of the device shown in Figs. 1 and 2; Fig. 4 is an enlarged fragmentary perspective view showing the mechanism for introducing the range and deflection corrections; Figs. 5, 6 and 7 are views showing details of the apparatus of Fig. 4; Fig. 8 is a fragmentary simplified view showing the parallax mechanism; Fig. 9 is a plan view of the parallax mechanism; Fig. 10 is a perspective view of the parallax mechanism; Fig. 11 is a fragmentary view showing details of the parallax adjusting mechanism; Fig. 12 is a diagrammatic representation of the relative positions of the director, the target and the gun or receiving station; Fig. 13 is a diagrammatic representation of the mechanical triangle set up by the parallax mechanism; Fig. 14 is a diagrammatic representation of a system for transmitting angular motion; Fig. 15 is a view showing in a simplified form the mechanism for transmitting the movements of the director in elevation; Fig. 16 is a view showing in simplified form the mechanism for transmitting the movements of the director in train; Fig. 17 is a view showing details of the apparatus of Fig. 16; Fig. 18 is a simplified representation of the mechanism for transmitting target bearing; Fig. 19 is a diagrammatic representation of an electrical differential device; Fig. 20 is a fragmentary view showing details of the operating means for the differential device; while Fig. 21 is a view showing in simplified form the mechanism for driving the operator's platform.

Referring to Figs. 1 and 2 of the drawing, the sighting instrument or director for remotely controlling guns comprises in one form of our invention a hollow pedestal support 10, provided with three legs 11, 12 and 13, spaced at 120° angles, which project outward radially and rest on a suitable base plate 14. Two of the legs, 11 and 12, are provided with leveling screws 15 and 16 by means of which the device may be adjusted or leveled so that the center line or central axis of the pedestal is parallel with the train axis of the gun. Usually this adjustment is such that the central axis of the pedestal is substantially vertical when the ship's deck is substantially level, i. e. in the position assumed when the ship is on an even keel and at rest in quiet water.

Inside the pedestal support 10 are three concentric sleeves 17, 18 and 19. These sleeves are rotatably mounted on the pedestal 10 and in the operation of the device have limited freedom of rotation with respect to each other. They are concentric with the pedestal and rotate about the central axis of the pedestal. The outer sleeve 17 is rotatably mounted on the pedestal on a ball thrust bearing 20 and is held concentric thereof by means of radial bearings 21 and 22. The middle sleeve 18 is mounted on sleeve 17 on a ball thrust bearing 23 and is held concentric with sleeve 17 by radial bearings 24 and 25. In a similar manner the inner sleeve 19 is mounted on the central sleeve 18 on a ball thrust bearing 26 and is held concentric with sleeve 18 by means of radial bearings 27 and 28.

Before going further into the details of the apparatus, it may be helpful to point out that the sighting devices shown as telescopes 29 and 30, are carried by the outer sleeve 17; that parallax corrections are introduced in the movements of the telescopes in train, i. e., about the central axis of pedestal 10, by means of a special driving connection 31 between the outer sleeve 17 and the middle sleeve 18, and that corrections for deflection suitably compensated for the inclination, if any, of the train axis of the gun are introduced between the middle sleeve 18 and the inner sleeve 19. The sleeve 19 is thus affected with the necessary corrections in train for directing the gun on the target, and its movements with relation to the stationary pedestal 10 are transmitted to the gun, by means of a suitable motion transmitting system. For determining the elevation of the gun, suitable mechanism is carried by the sleeves in which provision is made for introducing the range correction and an elevation component of the deflection correction, when required, to compensate for inclination of train axis of the gun.

On the upper end of the outer sleeve 17 are two diametrically opposite vertical brackets 32 and 33 (Fig. 2). The middle sleeve 18 has similar brackets 34 and 35, and likewise the inner sleeve 19 has similar brackets 36 and 37. These brackets are of the same height and form bases or supports for three pairs of upwardly extending brackets 38—39, 40—41, and 42—43, respectively.

Pivotally mounted at its ends on the upper ends of the outer pair of brackets 38—39 is a yoke member 44 (Figs. 3 and 4) which carries the telescopes 29 and 30, and pivotally mounted on the middle pair of brackets 40—41 is a substantially rectangular shaped member 45, one end of which is embraced by the yoke 44. The member 45 is slidably and pivotally secured to the yoke 44 centrally at one end by means of a guide 46 (Fig. 5) carried by member 45 having parallel guiding surfaces between which closely fits a roller 47 secured to the yoke 44. The guide 46 is parallel with the pivot axis of the member 45 on the brackets 40 and 41. The axis of the roller 47 is perpendicular to the pivot axis of the yoke 44 on the brackets 38 and 39 and intersects the central axis of the pedestal 10. A pin 48 is pivotally mounted centrally on the member 45.

The inner pair of brackets 42—43 carry a gun pilot member 50. The gun pilot is mechanically connected to the member 45 through an intermediate irregularly shaped member 51 which may be termed the cross leveling member. This cross leveling member is secured at one end to the pin 48 (Fig. 5) and its other end is secured to a pin 52 (Fig. 1) which is mounted in a ball bearing 53 in the member 45. The pivot axis of pin 52 is coincident with the pivot axis of pin 48. Secured to the lower side of the cross leveling member 51 is an arm 54, the outer end of which is provided with a laterally extending gear segment 55 (Fig. 5) which slides in a guide 56 in the cross leveling member 51. The arm 54 is known as the deflection arm since deflection corrections are introduced by changing its position with relation to the cross leveling member 51. It is pivotally mounted on a stud 57 which is secured to the cross leveling member. A vertical gear segment 58 is pivotally mounted in bearings 58ª (Fig. 1) on the gun pilot 50, and cooperates with a worm 59 carried by the deflection arm 54 by means of which the gun pilot may be adjusted in elevation.

The gear segment 58 slides in a vertical guide 60 carried by the deflection arm.

The axes of the yoke 44, the member 45, and the gun pilot 50 on their supporting brackets intersect the central axis of the pedestal 10 at right angles thereto and are of equal heights. The axis of stud 57 intersects the central axis of the pedestal 10. The axis of the gun pilot 50, that is, the axis of rotation of gear segment 58 on the gun pilot, is perpendicular to the gun pilot trunnion axis on brackets 42 and 43 and intersects the axis of the pedestal 10, and likewise the axis of the cross leveling member 51, defined by the pins 48 and 52, is perpendicular to the trunnion axis of member 45 on brackets 40 and 41, and intersects the axis of pedestal 10.

These axes all intersect the central axis of the pedestal at a common point. The telescopes 29 and 30 are mounted on a member 61 (Fig. 2) joining the pivoted ends of the yoke 44.

The deflection arm 54 is adjustable about its axis on stud 57 for the introduction of deflection corrections by means of a knob 62. As shown in Fig. 5, this knob turns a worm 63 which cooperates with a worm wheel 64. On the lower end of the shaft of worm wheel 64 is a pinion 65 which meshes with the gear segment 55. This adjusting mechanism, cooperating with gear segment 55, is carried by the cross leveling member 51.

A similar adjustment is provided for changing the vertical relation of the gun pilot with respect to the cross leveling frame 51 whereby the range correction can be introduced. This correction is applied by turning a knob 66 (Figs. 6 and 7) which turns a worm 67 meshing with the gear segment 58. This adjusting mechanism is carried by the deflection arm 54.

To facilitate the introduction of these corrections with great accuracy the knob 66 is provided with a drum 68 secured thereto on which a suitable range scale 69 modified for vertical parallax to a predetermined base line is inscribed in the form of a helix. A different drum may be used for reduced charge. The vertical base line is the vertical distance between the trunnion axis of the gun pilot and gun trunnion axis. An index or mark 70 against which the scale 69 is read is carried by a slider 71. The slider 71 is movable in guides 72 in the support 73 for the adjusting mechanism in a direction parallel with the axis of the drum 68. As the knob 66 is turned, the slider 71 is raised or lowered as the case may be by means of a screw 74 rotated with the drum which cooperates with threads 75 cut in the slider. The position of the index mark 70 is thus maintained in position to read against the proper turn of scale 69. Similar scale mechanism is provided with the knob 62, the scale in this case being graduated in terms of deflection. Tubes 76 may be provided for conveying lubrication to the guide 60 and various parts of the adjusting mechanism for the gun pilot.

During the operation of the instrument, the gear segment 58 is maintained in a vertical position throughout the rolling and pitching movements of the ship regardless of the angular position of the other parts of the device. This is effected by adjusting the position of the cross leveling member 51 about its axis on frame 45. A cross leveling telescope 80 is mounted on a bracket 81 which is secured to a gear sector 82, a swivel mounting being provided so that the telescope can be turned in a horizontal plane, if necessary, to avoid obstructions. This gear sector 82 is secured to a shaft 83 (Fig. 4) which is mounted on bearings in a casing 84 secured on one end of the frame 45. Also carried in the casing 84, is a worm 85 which may be rotated by hand cranks 86 and 87 secured to the shaft thereof. This worm meshes with the worm gear sector 82. On the shaft 83 is a gear sector 88 which meshes with an idler gear 89 mounted in the casing 84 and meshing in turn with a gear sector 90 which is secured to the cross leveling member 51. The cross leveling telescope 80 is arranged to be sighted on the horizon, the line of sight being at right angles to the axis of movement of the cross leveling member 51 on the frame 45 as defined by pins 48 and 52. For convenience in operation the telescope is provided with means for directing its line of sight at right angles in the manner of a periscope. The telescope is provided with suitable cross hairs which are maintained on the horizon by turning hand wheels 86 and 87. It will be observed that the cross leveling member 51 is swung about its pivot on the frame 45 in the same direction that the telescope is swung about its pivot on the shaft 83. The initial adjustment is such that the gear segment 58 is vertical when the telescope 80 is directed on the horizon, and it will be observed that by maintaining the telescope on the horizon the gear segment 58 will be maintained vertical.

It will be understood that the axis of the gun pilot 50 is an accurate indication of the proper angular position of the gun in space to hit the target designated by the telescopes 29 and 30, provided all corrections have been introduced and the telescope 80 is pointing on the horizon. The mechanism for introducing the range and deflection corrections in the position of the gun pilot has been described.

The telescopes are adjusted in elevation about their elevation axis on supports 38 and 39 by means of a worm 91 which cooperates with the worm gear segment 92, rigidly secured to the gun pilot. The plane of gear segment 92 is perpendicular to the trunnion axis of the gun pilot, and the axis of the gun pilot lies in the plane of the gear segment 92. The worm 91 is mounted at one end in a bearing 93 secured to supports 42 and 43 and is rotated by means of a hand wheel 94 (Fig. 1) which is geared to the shaft 91ª of the worm. This movement in elevation applied to the gun pilot by means of the hand wheel 94 is imparted to the telescopes through the mechanism previously described. When the range correction is introduced by turning the knob 66, it will be observed that the telescopes will be moved in elevation, the gun pilot being secured by worm 91. The handwheel 94 is then turned to bring the telescopes back on the target, if necessary, and the correction thereby applied to the gun pilot.

As shown in Fig. 2, the telescope 29 is mounted in a bracket 29ª in such manner that it has a slight freedom of rotation about an axis parallel with the central axis of the pedestal, but is constrained to move with the yoke 44 in elevation. The position of this telescope determines the elevation adjustment of the instrument. The telescope 30 is used in giving the instrument its adjustment in train, this telescope being mounted in a bracket 30ª so as to move with the yoke 44 in train but have a slight freedom of movement in elevation. The slight freedom of movement of the telescopes in the planes in which their movements do not need to be accurate is provided for the convenience of the operators. Each telescope carries an open sight for use in emergencies and for preliminary adjustments. These open sights are designated by the reference characters 29ᶜ and 29ᵈ.

The parallax mechanism 31, forming the driving connection between the outer sleeve 17 and the middle sleeve 18, is shown in a somewhat simplified form in Fig. 8. On the lower end of sleeve 17 is a radially extending arm 100 in the end of which is a radial slot 101. A pin 102 slides in the slot and is secured to an eccentric sleeve 103 a predetermined distance from the center of the sleeve. The eccentricity of sleeve 103 can be varied with respect to the axis of the pedestal. A universal driving connection or joint is provided between the sleeve 103 and the middle sleeve 18. As shown, this driving connection comprises a horizontal cross-shaped member 104 having a central aperture 104ª. Two oppositely situated arms 105 and 106 of the cross are slidably connected to the sleeve 103 while the two other arms 107 and 108 are slidably connected to sleeve 18. As shown, the sleeve 103 is provided on its upper end with a flange 109 on which are mounted diametrically opposite, two pairs of rollers 110 and 111 between which the arms 105 and 106 move. In a similar manner, brackets 112 and 113 are provided on the lower end of sleeve 18 and these brackets carry pairs of spaced rollers 114 and 115 respectively which form guides for the arms 107 and 108 of the cross. Preferably, one roller of each pair is secured to an eccentric pin or otherwise mounted whereby the spacing of the rollers may be adjusted to provide a snug fit for the arms of the cross.

The eccentric sleeve 103 is rotatably mounted on a slider member 116. This slider member is mounted on a cross web 117 extending along a diameter and forming part of a ring-shaped member 118 which is carried by the pedestal 10 (Figs. 1 and 2). As shown in Figs. 9 and 10, grooved parallel tracks or guides 119 and 120 are provided on the web and form runways for rollers 121 to 124 inclusive, carried by the member 116. The faces of these rollers are beveled to fit in the tracks. To provide for adjustment, the roller 121 is mounted on a slide 125 so that it may be adjusted with relation to roller 123 by loosening a clamping bolt 126. A similar adjustment is provided for roller 124 whereby it may be adjusted with relation to roller 122. A spring 127 attached to the right hand end of the slider 116, as viewed in Fig. 9, counterbalances the weight of a central sleeve 135 (Fig. 8) and thereby eliminates any bias of the slider 116.

Secured to the lower side of the slider 116 is a rack 128 which extends downward through an aperture 129 in the cross web 117. The aperture 129 is elongated to provide for considerable freedom of movement of the rack 128 and a corresponding freedom of the slider 116. Cooperating with the rack 128 is an idler gear 130 which is secured to a boss 131 depending from the cross web 117. The boss 131 is provided with a suitable bore to receive a sleeve 132 carrying a rack 133 extending parallel with its axis which rack meshes with the idler gear 130. An elongated aperture 134 is provided in the side wall of the boss through which the rack 133 extends into engagement with the gear 130. The sides of the slot 134 form guides for the rack 133 parallel with the axis of the pedestal. The sleeve 132 is thus secured against rotation but is free to move up and down, this motion being transferred through the gear 130 to the slider member 116 whereby the eccentricity of the sleeve 103 can be adjusted.

The sleeve 132 is mounted on suitable bearings on the lower side of a parallax adjustment sleeve 135 which extends upward in concentric relation with the axis of the pedestal and has secured on its upper end a sleeve 136 (Fig. 11). This sleeve 136 carries a gear rack 137 which is parallel with the axis of the pedestal. Co-operating with the rack 137 is adjusting mechanism which is mounted on an upper table 138 (Fig. 1) secured on the upper end of the inner sleeve 19, the table being provided with apertures 138ª and 138ᵇ (Fig. 3), through which the brackets 38, 40 and 39, 41 extend. As indicated in Fig. 11, this adjusting mechanism comprises a spur gear 139 meshing with the rack 137 and mounted on a shaft 140 on the other end of which is secured a spur gear 141. A rack 142 cooperates with gear 141 and this rack is pivotally connected at point 143 to a lever arm 144. One end of the lever arm 144 is slidably secured in a guide member 145 which has a pivot 146 secured to a slider member 147. This slider member 147 is mounted in a guide 148 in the table 138 (Fig. 1) and is adjustable in its guides to vary the leverage of the arm 144. The oppoelongated holes, will be loosened, and after the adjustment is made, again tightened. The member 118 is adjusted so that a b is parallel with A B, that is, so that the direction of movement of slider 116 is parallel with A B, but obviously some other relation may be used, the various other parts being correspondingly adjusted.

By adjusting the position of the slider 147, the parallax mechanism is set for the particular distance A B. This adjustment permits the use of a screw 150ª of standard calibration for various distances A B.

As indicated in Fig. 11, the upper end of the sleeve 136 is secured radially to the table 138 by means of three rollers 165, 166 and 167. These rollers bear against the sleeve 136 and are placed at 120° intervals around the sleeve, their axes being at right angles to the axis of the pedestal. To provide for adjustment the rollers are mounted on eccentric pins 165ª, 166ª, and 167ª. The lower end of sleeve 135 is secured radially in a similar manner by rollers which are carried by the boss 131 (Fig. 10), two of which are indicated by the reference numerals 168 and 169.

The angular movements of the gun pilot on the director at A are transmitted by suitable electrical means to a receiving station at B. As previously stated, these movements are transmitted in an elevation plane defined by the trunnion axis of the gun pilot, and in a train plane defined by the central axis of the pedestal 10 about which the gun pilot is movable.

Any suitable electrical system for the transmission of angular motion may be used. Preferably an alternating current system is used as indicated diagrammatically in Fig. 14. Briefly, such a system may consist of a transmitting device or transmitter, and a receiving device or receiver. The transmitting device is provided with a polycircuit armature winding 172, shown as physically similar to a three phase delta connected armature winding, and with a field winding 173. The receiving device is similar in construction being provided with a three circuit armature winding 174, and a field winding 175. One winding of each device, preferably the field winding, is rotatably mounted. The field windings are connected to a suitable source of alternating current supply 176, and induce electromotive forces in the circuits of their cooperative armature windings, the relative magnitudes of the electromotive forces induced in the circuits of an armature winding depending on the angular relation of the field winding thereto. Like points of the armature windings of the transmitting and receiving devices are interconnected, and upon angular movement of the rotor of one device, the transmitter, an exchange of current is produced between the armature windings whereby a torque is produced which causes the rotor of the other device, the receiver, to follow the rotor of the transmitter.

The movements of the gun pilot in elevation are transmitted by means of two transmitters 177 and 177ª (Figs. 1, 2 and 3) which are geared to the driving shaft 91ª of the gun pilot. Two transmitters are provided, one operating in a high speed ratio to give great accuracy. The device 177 operates in a 6:1 speed ratio and the device 177ª operates in a 72:1 speed ratio with the angular movement in elevation of the gun pilot.

The driving connections for the transmitters, which are enclosed in casings 178, 179, are shown diagrammatically in Fig. 15. The transmitter 177ª is connected to the driving shaft 91ª by means of gears 180, 181 and 182, counter shaft 183 and gears 184 and 185. As shown, the hand wheel 94 is secured to the counter shaft 183. An extension 186 is provided on the rotor shaft of the transmitter 177ª, and the transmitter 177 is driven from this extension through a reducing gear train 187.

A graduated drum 188 is driven from the transmitter 177ª and a similar drum 189 is driven from the transmitter 177. These two drums are placed facing each other on a common axis of rotation, and are read against a stationary mark 190 through a window 191 (Fig. 3). The object of these drums is to furnish an indication of the position of the gun pilot being transmitted. A limit stop is provided comprising a cam 192 carried by shaft 183 and a cooperating cam 193 which is geared to shaft 183. These cams are arranged to engage with each other and prevent further movement of the gun pilot when it has been elevated or depressed to either one of its extreme positions, which positions correspond with the maximum elevation and depression movement of the gun.

Two transmitters 195 and 196 (Fig. 16) are provided for transmitting the movement of the gun pilot in train. These transmitters are hung from the top table 138, and are operatively connected to a ring gear 198 which is carried by the pedestal 10. It will thus be observed that these transmitters will be affected with the angular movement of the top table 138 with relation to the pedestal, which movement is the training movement of the gun pilot, since the gun pilot and the top table are both mounted on the inner sleeve 19. The top table 138 is turned around the pedestal by means of a hand wheel 199 carried by the top table, which handwheel is connected to the pedestal gear 198 through gears 200, 201, 202, 203, counter shaft 204, gears 205 and 206, counter shaft 207, gears 208 and 209, clutch 210, shaft 211, and gear 212 which meshes with the pedestal gear 198. The transmitter 195 is driven from shaft site end of the lever arm 144 is secured by means of a pin and slot connection 149 to a traveling nut 150 which is threaded on a shaft 151. A hand wheel 152 is provided on the shaft 151 by means of which the shaft can be rotated to vary the position of the traveling nut. The traveling nut is provided with a lateral extension 153 which moves in a guide 154 whereby the nut is prevented from rotating. To permit accuracy of adjustment, the threads 150ª on shaft 151 are graduated in terms of range and these graduations are read against a stationary mark 155, carried by the traveling nut, the threads being observed through an aperture 156 in the nut. This adjusting mechanism carried by the table 138 is protected by a cover 157 (Fig. 3).

A splined connection is provided between the sleeve 136 and the table 138 whereby this sleeve and the parallax adjustment sleeve 135 are rotated with the table.

It will thus be observed that any rotation of hand wheel 152 is transmitted through the driving mechanism to the slider 116 whereby the eccentricity of sleeve 103 can be adjusted as desired. This adjustment is the range adjustment of the parallax mechanism.

The operation of the parallax mechanism can best be explained with reference to the diagrams shown in Figs. 12 and 13. Fig. 12 is a representation of the triangle formed by lines joining the sighting instrument or director located at A, a gun or receiving station located at B, and a target located at C. In Fig. 13, which shows the mechanical triangle set up by the parallax mechanism, $a\ c$ represents the arm 100, $a$ being on the central axis of the pedestal 10, $b$ represents a point on the axis of rotation of sleeve 103, and $b\ c$ represents the distance from the axis of sleeve 103 to the axis of pin 102.

Referring to Fig. 12, it will be observed that the bearing of the target C with relation to a reference or base line A B extended is measured by the angle A and the bearing of the target from the gun or receiving station B is represented by the angle B. Therefore, the bearing of the target, as determined by means of the director located at A, cannot be used in directing a gun at B but must be corrected by the amount of the parallax angle C, since it will be observed that angle B equals angle C plus angle A. Now the outer sleeve 17, which carries the telescope 30, will be given an angular movement equal to angle A when the telescope 30 is directed on the target. It is the purpose of the parallax mechanism to introduce a correction such that the middle sleeve 18 will be given an angular movement equal to angle B when the telescope 30 is directed on the target. This is effected by adjusting the apparatus so that the mechanical triangle $abc$ is made similar to the triangle ABC.

The mechanical triangle $abc$ is made similar to the actual triangle ABC by establishing the relations, angle $a$ equals angle A, and $\frac{a\ b}{AB}$ equals $\frac{b\ c}{BC}$. Angle $a$ is generated equal to angle A in bringing the telescope 30 to bear on the target, the mechanism having been initially adjusted to establish this relation, for example, by adjusting the apparatus so that angle $a$ will be zero when the telescope is pointing at the receiving station B. Since $b\ c$ and A B are fixed in length and also of known length, the relation $\frac{a\ b}{AB}$ equals $\frac{b\ c}{BC}$ may therefore be established by adjusting $a\ b$ inversely in proportion to the known range B C, which is done by means of the handwheel 152 since $a\ b$ is the eccentricity of the sleeve 103. Under actual battle conditions, the range B C is always greater than the base line A B and therefore the triangle $abc$ will always be similar to triangle ABC when the foregoing relations have been established. It will be observed that during a complete revolution of the telescope, the parallax correction will be zero at two points, a half revolution apart, i. e., when the line of sight of the telescope 30 is in the direction of the reference line A B. Furthermore, in moving the telescope from one zero point to another, the parallax correction will gradually increase to a maximum and then decrease to zero.

When the sleeve 103 has been adjusted properly and the telescope has been directed on the target, the sleeve 103 will therefore have been given an angular movement equal to angle B which is the desired bearing of the target from point B. This angular movement is imparted through the driving connection formed by the cross 104 to the middle sleeve 18 so that this sleeve is therefore affected, when the proper adjustments have been made, with the bearing of the target from the receiving station B.

The ring shaped member 118 can be adjusted with relation to the pedestal to establish a predetermined relation between base line $a\ b$ of the mechanical triangle, and the reference line A B. For convenience in making this adjustment the member 118 is provided with a gear rack 160 on its upper edge. A suitable aperture 161 (Fig. 1) is provided in the pedestal 10 adjacent to the gear rack 160 through which a suitable adjusting device 162 (indicated in dotted lines) may be inserted. This adjusting device has a bevel pinion 163 on its inner end which cooperates with the gear rack 160. By turning the device 162 the member 118 may be adjusted with great accuracy. Before making this adjustment the clamping bolts 164 for the member 118, which pass through 204 through gears 213 and 214 in a 72:1 speed ratio with the movement of the gun pilot. The transmitter 196 is driven from shaft 211 through a driving connection comprising gears 215 and 216, counter shaft 217 and gears 218 and 219, and its speed ratio with the gun pilot is 1:1. As shown the gears 201 and 202 are secured to a sleeve 202ª which is ratatably mounted on the counter shaft 207.

The clutch 210 is provided to change the driving connection for the hand wheel 199 whereby the telescopes may be swung around very quickly for slewing. It consists of two slider members 220 and 221 which are moved together from a lower position, as shown in the drawing, to an upper position or vice versa by means of forked arms 222 and 223. The member 220 is mounted on an extension 224 of gear 209, and is held against rotation with respect to gear 209 by means of a radial arm 225, the outer end of which is provided with a lateral extension 226 sliding in an aperture in the gear 209. The lower end of member 220 is provided with lugs 227 which interlock with corresponding lugs on the side of the gear 215, which is secured to the shaft 211. The gear 209 is loosely mounted on shaft 211, but when the clutch is thrown to its lowermost position, as shown, it is connected to shaft 211. A splined connection is provided between the upper clutch member 221 and the shaft 211. This member has lugs 228 on its upper end which are adapted to interlock with corresponding lugs on the side of a gear 229 which is loosely mounted on shaft 211.

When the clutch is thrown to its upper position it will be observed that the lower member 220 will be disengaged from the lugs on the gear 215, and consequently the gear 209 will be free to rotate on the shaft 211. The driving connection, however, will be established by means of the upper clutch member 221 which will then engage with the lugs on the lower side of gear 229. The driving connection for the hand wheel will now be from gear 202 through gear 229 meshing therewith, counter shaft 211 and gear 212. This gives a driving connection of much lower ratio.

It will be observed that the driving connection of the transmitter 195 is changed also when the clutch is thrown upward for slewing. The width of the lugs 227 of clutch member 220 is so arranged that each lug corresponds to a number of whole revolutions of the transmitter 195 so that when the clutch is again returned to its lower position for normal operation the transmitting device 195 will be connected to operate without any appreciable error, that is, this transmitter will be reconnected after losing a certain number of complete revolutions, which it will be observed, does not make any appreciable difference in its operation. For example, six lugs 227 may be provided on member 220 whereby it will be observed that every lug will represent two complete revolutions of the transmitter 195, and therefore, it can be displaced only through complete revolutions.

The arms 222 and 223 for shifting the clutch are carried by an upright rod 230 which may be raised or lowered to shift the clutch by turning a crank 231. As shown, the crank has secured to it a member 232 provided with an inclined cam slot 233 in which is a roller 234 attached to the rod 230. Due to the cooperation between the roller 234 and the cam slot, it will be observed that the rod 230 can be raised and lowered by turning the crank. It will be understood that the arms 222 and 223 are forked so as to embrace the parts 220 and 221 of the clutch in a well known manner. A splined connection prevents rotation of the rod 230.

On the lower end of the shaft 199ª of the hand wheel 199 are two diametrically opposite lugs 235 (Fig. 17). Adjacent to the lugs are two members 236 and 237, forming jaws, which are carried on one end of a pivoted lever arm 238. The opposite end of arm 238 is arranged to be engaged by a pin 239 secured to the gear 219. The lever arm 238 is normally latched in the position indicated in Fig. 17 by means of a spring pressed pin 240 which seats in a notch in the lever arm, whereby the lugs 235 have sufficient freedom to move past the jaws as the hand wheel 199 is turned. When the lever arm 238 is moved in either direction by engagement with the pin 239, it will be observed that one or other of jaws 236 and 237 will be moved in front of the lugs 235, and, therefore, prevent further rotation of the hand wheel. This forms a limit device whereby the movement of the telescopes in train is limited to a complete revolution, since the gear 219 moves in a 1:1 ratio with the telescopes, it being connected to the 1:1 speed transmitter 196. As shown, the jaws 236 and 237 are pivotally mounted and pressed toward each other against suitable stops by means of a spring 241. The jaws are movable outwardly slightly against the force of the spring to prevent jamming with the lugs 235.

Indicating dials 242 and 243 are connected to be driven at the same speeds as the transmitters 195 and 196 respectively i. e. in 72:1 and 1:1 speed ratios with the movement of the telescopes in train. These dials are mounted on top of the top plate 138 and are visible through a window 244 (Fig. 3). The dial 242 is geared to an extension of shaft 204 while the dial 243 is driven from the shaft of the transmitter 196 by means of gears 245 and 246 secured respectively to the dial and the shaft of the transmitter, and a rack member 247 connecting the gears. These dials give the operator an indication of the position of the telescope 30 actually being transmitted.

As shown, this driving mechanism for the transmitter 195 and 196 is mounted on three spaced plates 148ª, 148ᵇ and 148ᶜ, which are secured to the top table 138.

As has been previously pointed out, the movement of the middle sleeve is the bearing of the target from the station B (Fig. 12). In order to transmit this target bearing, the middle sleeve is provided with a lateral extension at its top which forms a sector shaped table 250, (Figs. 1 and 2). This table is arranged below the table 138, and is on the opposite side from the transmitters 195 and 196. Suspended from the table 250 are the motion transmitters 251 and 252 (Fig. 18). These transmitters are geared to the pedestal rack 198 so as to be driven in a 1:1 ratio with the movement of the middle sleeve 18. The transmitter 251 is somewhat smaller than the other and is connected to the pedestal rack through gears 253 and 254, counter shaft 255, gears 256 and 257, counter shaft 258 and gear 259, the latter of which meshes with the pedestal rack. The larger transmitter is driven from the counter shaft 255 through gears 260, 261 and 262. This driving connection, together with the transmitters 251 and 252, is mounted on three spaced plates 262ª, 262ᵇ and 262ᶜ, which are secured to the table 250.

The target bearing transmitters are used where extreme accuracy is not required and consequently 1:1 speed transmitters only are provided. The larger transmitter 252 may be utilized to drive a plurality of indicating devices such as may be used in directing searchlights. The smaller transmitter 251 is electrically connected to its receiver through a differential device 263 (Fig. 3) which is secured to the top table 138. This electrical connection between the transmitter 251 and the differential device is made through a flexible cable (not shown).

The differential device 263 comprises two polycircuit armature windings 263ª and 263ᵇ (Fig. 19) which are similar to the armature windings of the transmitters. One of these windings is rotatably mounted whereby the angular relation of the windings can be varied to introduce corrections between the transmitter 251 and its receiver. When the two windings are angularly displaced it will be observed that the set of voltages impressed on one winding by the transmitter will be induced in the other winding with new relative values, the effect being the same as if the transmitter were turned through a corresponding angle. This differential device is described and claimed in a copending application of Edward M. Hewlitt and Waldo W. Willard, Serial No. 501,007, filed September 15, 1921, and assigned to the same assignees as this invention.

As indicated in Fig. 20 the rotor of the differential device 263 may be adjusted to introduce corrections by means of a knurled knob 264 which is connected to the rotor through gears 265 and 266. A detent 267 having a pivot 267ª is held by a spring 268 against cams 265ª and 266ª secured to gears 265 and 266 respectively. This detent falls in notches in the cams, as shown in the drawing, when the windings of the differential device are not angularly displaced i. e. in the relative positions shown diagrammatically in Fig. 19. When the windings of the differential device are in these relative positions no corrections are introduced by it, and the object of the detent 267 is to give notice of this condition by falling into the notches in the cams. It will be understood that the detent does not lock the differential device but simply offers an impediment to its movement which is easily perceived by the operator.

A rotatably mounted circular platform 270 (Figs. 1, 2 and 3) is provided around the base of the pedestal 10. This platform comprises an upper circular or washer shaped framework 271 which is carried on a ring shaped supporting member 272. On the framework 271 are laid segmental plates 273 (Fig. 3). These plates may be removed to give access to the mechanism underneath the platform. On the lower edge of the supporting member 272 is a circular track 274 which rides on a plurality of spaced rollers 275. The rollers are mounted on the base plate 14, and are spaced to describe a circle, having the same diameter as track 274. The track is held on the rollers radially by means of a plurality of rollers 276, having vertical axes, which cooperate with the inner edge of the track 274.

The platform 270 is automatically driven around with the train movements of the telescopes in such manner that the operators are always in a predetermined relation with the telescopes. Referring to Fig. 8, the outer sleeve 17 is provided with a lower extension 277 which extends through the aperture in the cross 104 and through the sleeve 103, and has secured on its lower end a gear 278. Meshing with gear 278 is a gear 279 which is secured to the upper end of a counter shaft 280. This counter shaft has its axis parallel with the central axis of the pedestal, and is mounted in a bearing 281 which is secured to the boss 131 (Fig. 10). On the lower end of shaft 280 is a gear 282 which meshes with an idler gear 283 rotatably mounted on the lower end of boss 131.

The control means for the platform driving mechanism is actuated by gear 283. Referring to Figs. 2 and 21, the gear 283 is connected through gear 284, and a universal coupling 285 with a horizontal beveled gear 286 which is mounted on the base plate 14. The gear 286 is connected through a beveled pinion 287, counter shaft 288, gears 289 and 290, and counter shaft 291, with a beveled gear 292 which forms one side of a differential device, the opposite side being formed by a similar beveled gear 293. The gear 293 is secured to a counter shaft 294 which is connected through gears 295 and 296, counter shaft 297, and gears 298 and 299 with an internal rack 300 which is secured to the platform supporting member 272. An electric driving motor 301 for the platform is operatively connected through gear 302, counter shaft 303 and gears 304 and 305 with the counter shaft 297. It will be understood that the motor 301 is stationary it being mounted on the base plate 14, and it, therefore, operates to drive the platform. At the same time that the platform is driven it will be observed that gear 293 will be rotated.

Three bevel pinions 306, 306ª and 306ᵇ spaced at 120° intervals each cooperate with the two beveled gears 292 and 293. These three bevel pinions are carried by a spur gear 308 which is rotatably mounted on the counter shaft 291 and meshes with a gear 309 secured to a shaft 310. On the shaft 310 are four cams 311–314 inclusive. These cams cooperate respectively with contactor arms 315–318 inclusive which control the circuit of the driving motor 301. When the cams are turned to predetermined positions the contactor arms are selectively operated thereby to start the motor in the proper direction. For example, cams 311 and 312 may give low and high speed operation of the motor in one direction, while cams 313 and 314 may give low and high speed operation in the opposite direction.

It will thus be observed that any movement of the telescopes in train will be transmitted through the driving connections and the differential to the cam shaft 310 whereby the motor will be started and cause the platform to follow the telescopes. As the platform is driven around by the motor its movement is applied to the bevel gear 293 in such direction that the cam shaft 310 is turned in the direction opposite to the movement previously applied to it by the telescopes, and when the platform catches up with the telescopes the motor circuit will be opened, and the platform brought to rest. As long as the telescopes are being moved in train, therefore, it will be observed that the platform will be caused to follow with a slight lag.

A flange 319 (Fig. 2) is provided on the inner edge of the platform closely encircling the pedestal, a skirt member 320 on the pedestal overlaps the flange and forms therewith a watershed connection. The transmitters 195, 196, 251 and 252 and the operating mechanism therefor are enclosed by a casing 321 which is hung from the top table 138.

In the operation of the instrument, at least three operators are required, one for each of the telescopes 29 and 30, and the other for the cross leveling telescope 80. In addition to these three, one or more operators are required to introduce the various corrections by means of knobs 62 and 66, and the hand wheel 152. The operator for telescope 29 controls its adjustment in elevation by means of the hand wheel 94 so as to maintain it on the target, and the operator for telescope 30 controls its adjustment in train by means of the hand wheel 199 so as to maintain it on the target. At the same time the operator for the cross leveling telescope 80 controls its adjustment by means of cranks 86 and 87 so as to maintain it on the horizon. The operators stand on the platform 270 which is automatically operated to carry them round in train with the telescopes.

It will be observed that rotation of the hand wheel 199 is applied directly to turn the inner sleeve 19 and its table 138 around on the pedestal. This movement of the inner sleeve, however, is transmitted to the middle sleeve 18 by means of the mechanical connection between the two formed by the gun pilot 50 and the cross leveling member 51. From the middle sleeve 18 the movement is transmitted through the parallax mechanism, where it is suitably corrected for parallax, and then applied to the outer sleeve 17 which carries the telescopes.

When the range correction is introduced by turning the knob 66, the frame 45 and the yoke 44 are tilted about their trunnion axes whereby the telescope 29 is correspondingly elevated or depressed. Upon observing that telescope 29 is off the target, the operator for this telescope turns the hand wheel 94 to bring it back on the target and in doing this he applies the range adjustment to the gun pilot, elevating or depressing it. The deflection corrections applied by means of knob 62 result in movement of the frame 45 and yoke 44 together in train. This throws telescope 30 off the target in train, and its operator upon observing this turns hand wheel 199 so as to bring telescope 30 back on the target, and in so doing applies the deflection correction to the gun pilot 50.

In case the central axis of the pedestal is not vertical at the moment the range and deflection corrections are introduced, due to rolling and pitching of the ship, there will be a train component of the range correction which will be applied to the yoke 44 and frame 45 in train, and an elevation component of the deflection correction which will be applied to these members in elevation. This will be apparent when it is recalled that the gear segment 58 is maintained in a vertical position by the cross leveling telescope operator, and is therefore at an angle with the central axis of the pedestal when the pedestal is swung out of a vertical position out of the plane of said segment. The calculated values of the range and deflection corrections are always applied in respectively vertical and horizontal planes, however, regardless of the angular position of the other parts of the instrument, since these corrections are applied with respect to the vertical gear segment 58. These corrections are calculated for the vertical and horizontal planes in which they are introduced, and consequently errors would result were they introduced in any other planes. In other words, when the instrument is tilted so that the elevation and train axes of the gun pilot are not respectively horizontal and vertical, errors would result if the calculated range and deflection corrections were introduced in these planes. It will be obvious that when the axes of the gun pilot are inclined, the range and deflection corrections should each be resolved into components in these elevation and train planes. The mechanism of the instrument resolves these corrections into the proper components, when necessary, and then applies the components to the gun pilot.

After the range and deflection corrections have been applied, the gun pilot is adjusted in elevation and train to correspond with any change in the angular position of the instrument so that the introduced range and deflection corrections are changed to meet the new conditions. As the angular position of the instrument changes the operator of the cross leveling telescopes 80 in maintaining the gear segment 58 vertical imparts a certain amount of movement to the yoke 44, and frame 45 in both elevation and train. This throws the telescopes off the target, as previously described, and the operators in bringing the telescopes back on the target readjust the position of the gun pilot.

The operators for the telescopes 29 and 30 may, and probably will be unconscious of the fact that the range and deflection corrections are being introduced, or that these corrections are being changed by the operator of the cross leveling telescope 80. Their sole object is to maintain these telescopes on the target.

Meanwhile, during the operation of the instrument the hand wheel 152 is turned to introduce the proper range adjustment in the parallax mechanism. A change in the parallax range adjustment causes a displacement of the yoke 44 in train with relation to the member 45, whereby the telescope 30 is correspondingly moved in train. The telescope 30 is then brought back on the target at the discretion of the operator. The parallax correction for the new range adjustment is thus applied to the gun pilot.

Concurrently with the adjustment of the gun pilot the movements of the gun pilot in elevation are transmitted by the transmitters 176 and 177 and in train by the transmitters 195 and 196. Also the target bearing is transmitted by the transmitters 251 and 252. Although the transmitters only have been shown in connection with the instrument it will be understood that each transmitter is electrically connected to one or more receivers located at the point where the transmitted movements are utilized in directing the gun or other apparatus.

The large target bearing transmitter 252 is connected to a plurality of indicators at various points which may be utilized in directing star shell guns, while the small target bearing transmitter 251 is connected to one or more transmitters which are utilized in directing search lights. By turning the knob 264, the searchlight can be controlled independently of the director as desired. When moved off the target, the search light can be returned by turning it back until notice is given by the slipping of detent 267 into the notches in the cam 265ᵃ and 266ᵃ.

While we have described our invention as embodied in concrete form and as operating in a specific manner in accordance with the provisions of the patent statutes, it should be understood that we do not limit our invention thereto, since various modifications thereof will suggest themselves to those skilled in the art without departure from the spirit of our invention, the scope of which is set forth in the annexed claims.

What we claim as new and desire to secure by Letters Patent of the United States, is:

1. Gun directing apparatus comprising a sighting device adjustable about train and elevation axes, means for transmitting the movements of said sighting device about said axes to a remote receiving station, means for moving said sighting device about said axes independently of said transmitting means to introduce corrections for inclination of the trunnion axis of the gun, and means for readjusting said sighting device about said axes whereby said corrections are applied to said transmitting means.

2. Gun directing apparatus comprising a sighting device adjustable about train and elevation axes, means for transmitting the movements of said sighting device about said axes to a remote receiving station, means for moving said sighting device about said axes to introduce corrections for range and for inclination of the trunnion axis of the gun independently of said transmitting means, and means for readjusting said sighting device about said axes whereby said corrections are applied to said transmitting means.

3. Gun directing apparatus comprising a sighting device movable about train and elevation axes, a gun pilot mounted for movement about train and elevation axes, a driving connection between said sighting device and said gun pilot, means for adjusting said connection to apply corrections to said sighting device independently of said gun pilot, and means for adjusting said gun pilot about its axes to readjust said sighting device about its axes whereby said corrections are applied to said gun pilot.

4. Gun directing apparatus comprising a sighting device movable about train and elevation axes, a gun pilot mounted for movement about train and elevation axes, a mechanical connection between said gun pilot and said sighting device including means for adjusting said connection to adjust said sighting device independently of said gun pilot to introduce corrections, and means for adjusting said gun pilot about its axes to readjust said sighting device about its axes whereby said corrections are applied to said gun pilot, and means for transmitting the movements of said gun pilot.

5. Gun directing apparatus comprising three members mounted for rotation about an axis parallel with the train axis of the gun, a sighting device mounted on one of said members on an axis perpendicular to the axis of said member, a driving connection between said member and a second of said members including means for introducing parallax corrections, a gun pilot mounted on the third member on an elevation axis perpendicular to the axis of said sleeves, a mechanical connection between said gun pilot and said sighting device including means for adjusting said sighting device independently of said gun pilot to introduce corrections, means for adjusting said gun pilot about the axis of said members and its elevation axis to readjust said sighting device about its axes whereby said corrections are applied to said gun pilot, motion transmitting means driven by said third member, and motion transmitting means driven by movement of said gun pilot about its elevation axis.

6. Gun directing apparatus comprising a gun pilot member movable on train and elevation axes perpendicular to each other, a sighting device mounted for rotation about said train axis and an independent elevation axis perpendicular thereto, a mechanical connection between said gun plot and said sighting device including means for moving said sighting device independently of said gun pilot to introduce corrections, and means for adjusting said gun pilot in elevation and train to readjust said sighting device about said train axis and said independent elevation axis.

7. Gun directing apparatus comprising a gun pilot member movable on train and elevation axes perpendicular to each other, a sighting device mounted for rotation about said train axis and an independent elevation axis perpendicular thereto, a mechanical connection between said gun pilot and said sighting device including means for introducing the range and deflection corrections in respectively vertical and horizontal planes, whereby said sighting device is moved independently of said gun pilot, and means for adjusting said gun pilot in elevation and train to readjust said sighting device about said train axis and said independent elevation axis, whereby said corrections are applied to said gun pilot.

8. Gun directing apparatus for ships comprising a sighting device mounted for movement about elevation and train axes, a gun pilot mounted for independent movement about elevation and train axes, a link forming a connection between said gun pilot and said sighting device, and means for maintaining said link in a predetermined angular position regardless of the rolling and pitching movements of the ship whereby corrections are introduced in train and elevation.

9. Gun directing apparatus for ships comprising a sighting device mounted for movement about elevation and train axes, a gun pilot mounted for independent movement about said train axis and an elevation axis, a link forming a connection between said gun pilot and said sighting device, a cross leveling sighting device, and means for adjusting said link and said cross leveling sighting device simultaneously to maintain said link in a predetermined angular position regardless of the rolling and pitching movements of the ship whereby corrections are introduced in train and elevation.

10. Gun directing apparatus comprising a gun pilot mounted to rotate about a train axis parallel with the train axis of the gun and about an elevation axis perpendicular to said train axis, a sighting device mounted for rotation about said train axis and about an independent elevation axis perpendicular to said train axis, a connection between said gun pilot and said sighting device including a member adjustable in predetermined planes at right angles to each other to introduce the range and deflection corrections between said gun pilot and said sighting device, whereby said sighting device is moved independently of said gun pilot, means for adjusting said member to maintain said predetermined range and deflection correction planes respectively vertical and horizontal regardless of the inclination of said train axis, whereby train and elevation components of said range and deflection corrections are generated and applied to said sighting device, and means for adjusting said gun pilot in elevation and train to readjust said sighting device about said train axis and said independent elevation axis.

11. Gun directing apparatus comprising a gun pilot mounted to rotate about a train axis parallel with the train axis of the gun and about an elevation axis perpendicular to said train axis, a sighting device mounted for rotation about said train axis and about an independent elevation axis perpendicular to said train axis, a mechanical connection between said gun pilot and said sighting device comprising a member movable about said train axis, said independent elevation axis and a third axis perpendicular to both, and a second member connected to said first member so as to be adjustable with relation to said first member in planes perpendicular to each other, means for moving said first member on one of its axes to maintain said planes of adjustment of said second member respectively vertical and horizontal whereby said sighting device is moved, means for relatively adjusting said members to apply range and deflection corrections in said vertical and horizontal planes respectively, said corrections being applied to said sighting device, and means for moving said gun pilot about its train and elevation axes to readjust said sighting device.

12. Gun directing apparatus comprising a gun pilot mounted to rotate about a train axis parallel with the train axis of the gun and about an elevation axis perpendicular to said train axis, a sighting device mounted for rotation about said train axis and about an elevation axis perpendicular to said train axis, a mechanical connection between said gun pilot and said sighting device comprising a member movable about said train axis and pivoted on an axis perpendicular to said train axis, a second member pivoted on said first member about an axis perpendicular to the pivot axis of said first member, the elevation axis of said gun pilot and the pivot axes of said members having a common point of intersection lying on said train axis, a third member mounted on said second member and movable with relation thereto in adjustment planes perpendicular to each other, means for adjusting said second member about its pivot on said first member to maintain said adjustment planes respectively vertical and horizontal whereby said sighting device is moved, means for relatively adjusting said second and third members in said vertical plane to apply the range correction between said gun pilot and sighting device, means for relatively adjusting said second and third members in said horizontal plane to apply the deflection correction whereby the elevation axis of said gun pilot and the pivot axis of said first member are angularly displaced, said corrections being initially applied to said sighting device, means for adjusting said gun pilot to readjust said sighting device, and motion transmitting means driven by said gun pilot.

13. Gun directing apparatus comprising a gun pilot mounted to rotate about a train axis parallel to the train axis of the gun and about an elevation axis perpendicular to said train axis, a member rotatable about said train axis, a second member pivoted on said first member about an axis perpendicular to said train axis, a third member pivoted on said second member about an axis perpendicular to the pivot axis of said second member, a pivotal connection between said third member and said gun pilot, means for displacing said third member with relation to said gun pilot in predetermined planes to apply the range and deflection corrections to said second member, means for leveling said third member about its pivot axis whereby the train and elevation components of the range and deflection corrections are applied to said second member, a sighting device operatively connected to said second member, means for adjusting said gun pilot member, means for adjusting said gun pilot about its axes to readjust said sighting device whereby said corrections are applied to said gun pilot, and motion transmitting means driven by said gun pilot.

14. Gun directing apparatus comprising three rotatable members, a driving connection between two of said members including means for introducing parallax corrections, a driving connection between the remaining member and one of the other members including means for introducing corrections for inclination of the trunnion axis of the gun, and a sighting device mounted on one of said members.

15. Gun directing apparatus comprising three concentric rotatable members, means for introducing parallax corrections forming a driving connection between two of said members, means for introducing corrections for inclination of the trunnion axis of the gun forming a driving connection between the remaining member and one of the other members, and a sighting device carried by one of said members.

16. Gun directing apparatus comprising three rotatable members, a sighting device mounted on one of said members, an operating connection between said member and a second of said members including means for introducing parallax corrections, and an operating connection between said second and the third of said members including means for generating and introducing the train components of the range and deflection corrections.

17. Gun directing apparatus comprising three members rotatable about a common axis, a sighting device mounted on one of said members, an operating connection between said member and a second of said members including means for introducing parallax corrections, and an operating connection between said second member and the third of said members including means for generating and introducing the train components of the range and deflection corrections.

18. Gun directing apparatus comprising three concentric sleeves rotatable about an axis parallel with the train axis of the gun, a support on the upper end of the outer sleeve, means for introducing parallax corrections forming a driving connection between the outer sleeve and the middle sleeve, means on said support for applying a range adjustment to said parallax means, means for introducing corrections for inclination of the trunnion axis of the gun forming a driving connection between said middle sleeve and the innermost sleeve, and a sighting device mounted on said support.

19. Gun directing apparatus comprising three concentric sleeves rotatable about an axis parallel with the train axis of the gun, a driving connection between the lower ends of two of said sleeves including means for introducing parallax corrections, means secured to the upper end of one of said latter sleeves for applying a range adjustment to said parallax means, a driving connection between the remaining sleeve and one of the other sleeves including means for introducing corrections for inclination of the trunnion axis of the gun, and a sighting device carried by one of said sleeves.

20. Gun directing apparatus comprising three concentric sleeves rotatable about an axis parallel with the train axis of the gun, means for introducing parallax corrections forming a driving connection between the outer sleeve and the middle sleeve at their lower ends, a table on the upper end of said inner sleeve, means on said table for introducing a range adjustment in said parallax means, a telescope carried by said outer sleeve and movable therewith in train, means for introducing corrections for inclination of the trunnion axis of the gun forming a driving connection between said middle sleeve and the innermost sleeve, and means for transmitting the motion of said inner sleeve to the gun.

21. Gun directing apparatus comprising a support, three concentric members rotatably mounted on said support, a sighting device carried by the outer member, a driving connection between said outer member and the middle member including means for introducing a correction for parallax between said sighting device and a remote receiving station in the movement applied to said middle member, a driving connection between said middle member and the innermost member including means for introducing a correction in the movement applied to said inner member proportional to the inclination of the trunnion axis of the gun, means for rotating said inner member on said support to bring the sighting device to bear on the target, and means for transmitting the movements of said inner member to said receiving station.

22. Gun directing apparatus comprising three rotatable members, a driving connection between two of said members including means for introducing parallax corrections, a driving connection between the remaining member and one of the other members including a cross leveling member, means for maintaining said cross leveling member in a predetermined angular position in space regardless of the inclination of the trunnion axis of the gun whereby corrections are introduced corresponding to the inclination of said trunnion axis, and a sighting device mounted on one of said members and movable therewith.

23. Gun directing apparatus comprising three concentric sleeves rotatable about an axis parallel with the train axis of the gun, a driving connection between two of said sleeves including means for introducing a parallax correction in train, a driving connection between the third of said sleeves and one of the other sleeves including a cross leveling member, means comprising a telescope for maintaining said cross leveling member in a predetermined angular position in space regardless of the inclination of the trunnion axis of the gun whereby corrections are introduced in accordance with the inclination of said trunnion axis, a sighting device mounted on one of said members and movable therewith, and gun train transmitting means driven by said third sleeve.

24. Gun directing apparatus comprising a pedestal support, three concentric sleeves rotatably mounted on said pedestal about an axis parallel with the train axis of the gun, a sighting device carried by the outer sleeve, a driving connection between said outer sleeve and the middle sleeve including means for introducing a correction of parallax between said sighting device and a remote receiving station in the movements applied to said middle sleeve, a driving connection between said middle sleeve and the innermost sleeve including a cross leveling member, means for maintaining said member in a predetermined angular position in space regardless of the inclination of the trunnion axis of the gun whereby the movements applied to said inner sleeve are corrected for the train component of said trunnion tilt, means for rotating said inner sleeve on said support to bring the telescope to bear on the target, and means for transmitting the movements of said inner sleeve to said receiving station.

25. Gun directing apparatus comprising three concentric sleeves, means for introducing parallax corrections forming a driving connection between the outer and middle sleeves, means for introducing corrections for inclination of the trunnion axis of the gun forming a driving connection between said middle sleeve and the innermost sleeve, and a telescope mounted on said outer sleeve and movable therewith in train, gun train transmitting means driven by said inner sleeve, and target bearing transmitting means driven by said middle sleeve.

26. Gun directing apparatus comprising a pair of concentric rotatable members, a frame pivotally mounted on one of said members about an axis perpendicular to the axis of rotation of said members, a cross leveling member pivotally mounted on said frame on an axis perpendicular to the axis of said frame, a cross leveling telescope pivotally mounted on said frame, the line of sight of said telescope being at right angles to the axis of said cross leveling member, means carried by said frame for adjusting said telescope about its axis, a driving connection between said cross leveling telescope and said cross leveling member whereby when said cross leveling telescope is maintained on the horizon said cross leveling member is maintained in a predetermined angular position about its axis, and an operating connection between said cross leveling member and the second of said rotatable members including means whereby the movements of said cross leveling member with relation to said frame are applied to said frame in terms of components of movement of said cross leveling member about the axis of said frame and the axis of said first rotatable member.

27. Gun directing apparatus comprising a support, a pair of concentric members rotatably mounted on said support, a frame pivotally mounted on one of said members about an axis perpendicular to the axis of rotation of said members, a sighting device operatively connected to said frame, a cross leveling member pivotally mounted on said frame on an axis perpendicular to the axis of said frame, a cross leveling telescope pivotally mounted on said frame, the line of sight of said cross leveling telescope being at right angles to the axis of said cross leveling member, means carried by said frame for adjusting said cross leveling telescope about its axis, a driving connection between said cross leveling telescope and said cross leveling member whereby when said cross leveling telescope is maintained on the horizon said cross leveling member is maintained in a predetermined angular position about its axis, a driving connection between said cross leveling member and the second said rotatable members including means whereby the movements of said cross leveling member with relation to said frame are applied to said frame and the sighting device thereby moved off the target, means for adjusting said second rotatable member about its axis to bring the sighting device back on the target in train, and means for adjusting said frame on its axis to bring the sighting device on the target in elevation.

28. Gun directing apparatus for ships comprising two members mounted for independent rotation about a common axis parallel to the train axis of the gun, a sighting device mounted on one of said members, a gun pilot mounted on the other member, a link forming a connection in elevation and train between said sighting device and said gun pilot, and means for adjusting said link so as to maintain it in a predetermined angular position regardless of the rolling and pitching movements of the ships whereby corrections are introduced in train and elevation.

29. Gun directing apparatus for ships comprising two members mounted for independent rotation about a common train axis parallel with the train axis of the gun, a sighting device mounted on one of said members so as to be movable about an elevation axis, a gun pilot mounted on the other member so as to be movable about an elevation axis, a link forming a connection in elevation and train between said sighting device and said gun pilot, a cross leveling telescope, and means for adjusting said cross leveling telescope and said link together so as to maintain said link in a predetermined angular position in space regardless of the rolling and pitching movements of the ship whereby corrections are introduced in train and elevation.

30. Gun directing apparatus comprising three members mounted for rotation about a common train axis parallel with the train axis of the gun, a sighting device mounted on one of said members, a driving connection between said member and a second of said members including means for introducing parallax corrections, a gun pilot mounted on the third of said members, and a connection in elevation and train between said gun pilot and said sighting device including means for applying corrections for tilt of said train axis.

31. Gun directing apparatus for ships comprising three members mounted for rotation about a common axis, a sighting device mounted on one of said members, a driving connection between said member and a second of said members including means for introducing parallax corrections, a gun pilot mounted on the third member, a driving connection between said gun pilot and said second member including a pivoted link, means for maintaining said link in a predetermined angular position regardless of the rolling and pitching movements of the ship whereby said first and second members are rotated with respect to said third member to introduce corrections and means for relatively adjusting said second member and said link to apply deflection corrections.

32. Gun directing apparatus comprising three members mounted for rotation about a common axis parallel to the train axis of the gun, a sighting device on one of said members, a driving connection between said member and a second of said members including means for introducing parallax corrections, a gun pilot mounted on the third of said members, a pivoted link forming a connection in elevation between said gun pilot and said sighting device and a connection in train between said gun pilot and said second member, and means for maintaining said link in a predetermined angular position regardless of the rolling and pitching movements of the ship whereby corrections in train and elevation are applied to said sighting device, and means for relatively displacing said link and said second member to introduce deflection corrections.

33. Gun directing apparatus comprising three concentric sleeves rotatable about an axis parallel with the train axis of the gun, a sighting device mounted on one of said sleeves, an operating connection between said sleeve and a second of said sleeves including means for introducing parallax corrections, a gun pilot mounted on the third of said sleeves, a pivoted member forming a driving connection between said second sleeve and said gun pilot, means for moving said member to a vertical position whereby the other two sleeves are rotated with relation to said third sleeve, and means for adjusting said second sleeve in a horizontal plane with relation to said member to introduce deflection corrections.

34. Gun directing apparatus comprising three concentric sleeves rotatable about an axis parallel with the train axis of the gun, a gun pilot mounted on the innermost sleeve, a frame pivoted on the middle sleeve on an axis perpendicular to said train axis, an intermediate member pivotally connected to said gun pilot and frame, means for swinging said intermediate member about its pivot on said gun pilot so as to maintain it in a vertical plane regardless of the inclination of said train axis whereby the train and elevation components of the range and deflection corrections are applied to said frame, a driving connection between the outer sleeve and said middle sleeve including means for introducing corrections for parallax, a second frame pivotally mounted on said outer sleeve on an axis perpendicular to said train axis, a connection between said frames permitting relative movement about said train axis, a sighting device carried by said second frame, means for moving said inner sleeve about said train axis to adjust said sighting device in train, and means for moving said gun pilot about its axis to adjust said sighting device in elevation.

35. Gun directing apparatus comprising three concentric sleeves rotatable about an axis parallel with the train axis of the gun, a driving connection between the outer and middle sleeves including means for introducing a parallax correction, a member pivotally mounted on the middle one of said sleeves on an axis at right angles to said train axis, a second member pivoted on said first member on an axis at right angles to the pivot axis of said first member, a gun pilot pivotally mounted on said inner sleeve on an axis at right angles to said train axis, an arcuate member carried by said second member pivotally connected to the free end of said gun pilot, means for maintaining said arcuate member in a vertical position, and means for relatively adjusting said second member and said arcuate member in vertical and horizontal planes to introduce corrections for range and deflection, and a sighting device carried by said outer sleeve.

36. Gun directing apparatus comprising a pedestal support, three concentric sleeves rotatably mounted on said support about an axis parallel with the train axis of the gun, a sighting device pivoted on the outer sleeve on an axis perpendicular to the axis of said sleeves, a driving connection between said outer sleeve and the middle sleeve including means for introducing a correction for parallax between the sighting device and a remote receiving station, a member pivotally mounted on said middle sleeve about an axis perpendicular to the axis of said sleeve, a connection between said member and said sighting device permitting relative movement about the axis of said sleeves, a second member pivotally mounted on said first member about an axis perpendicular to the pivot axis of said first member, an arcuate member carried by said second member, a gun pilot pivotally mounted on the innermost sleeve on an axis perpendicular to the axis of said sleeves, a pivotal connection between said arcuate member and said gun pilot, means for relatively adjusting said second member and said arcuate member in the plane defined by said arcuate member to apply the range corrections and in a plane perpendicular thereto to introduce the deflection corrections, means for moving said second member on its pivot to maintain said arcuate member in a vertical position independently of the inclination of said train axis whereby said sighting device is affected with the train and elevaton components of the range and deflection corrections, means for moving said gun pilot about its axis to adjust said sighting device in elevation, means for turning said inner sleeve on said pedestal to adjust the sighting device in train, and motion transmitting means driven by said gun pilot and said inner sleeve respecitvely.

In witness whereof, we have hereunto set our hands this 28th day of May, 1925.

ALVARADO L. R. ELLIS.
CHESTER W. GREENE.

CERTIFICATE OF CORRECTION.

Patent No. 1,687,551.                                   Granted October 16, 1928, to

ALVARADO L. R. ELLIS ET AL.

It is hereby certified that error appears in the printed specification of the above numbered patent requiring correction as follows: Page 14, line 68, claim 27, for the word "members" read "member"; page 15, line 108, claim 36, for the word "sleeve" read "sleeves"; and that the said Letters Patent should be read with these correction therein that the same may conform to the record of the case in the Patent Office.

Signed and sealed this 15th day of January, A. D. 1929.

M. J. Moore,
Acting Commissioner of Patents.

(Seal)